(12) United States Patent
Haider et al.

(10) Patent No.: US 7,042,523 B2
(45) Date of Patent: May 9, 2006

(54) VIDEO CORRECTION SYSTEM AND METHOD USING LOGARITHMIC CONVERSION

(75) Inventors: Towfique Haider, Allen, TX (US); Walter H. Demmer, Nuremberg (DE); Bart DeCanne, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 477 days.

(21) Appl. No.: 10/610,150

(22) Filed: Jun. 30, 2003

(65) Prior Publication Data
US 2004/0268201 A1 Dec. 30, 2004

(51) Int. Cl.
*H04N 9/89* (2006.01)
(52) U.S. Cl. ..................................... 348/675
(58) Field of Classification Search ................ 348/675; H04N 9/69
See application file for complete search history.

(56) References Cited

U.S. PATENT DOCUMENTS

| | | | |
|---|---|---|---|
| 4,394,688 A | 7/1983 | Iida et al. | |
| 4,568,978 A | 2/1986 | Cosh | |
| 4,786,968 A | 11/1988 | Kutner | |
| 5,087,966 A | 2/1992 | Harradine | |
| 5,132,796 A | 7/1992 | Topper et al. | |
| 5,175,621 A | 12/1992 | Maesato | |
| 5,235,410 A * | 8/1993 | Hurley | 348/675 |
| 5,243,426 A | 9/1993 | Murayama et al. | |
| 5,255,083 A | 10/1993 | Capitant et al. | |
| 5,282,036 A | 1/1994 | Worley, Jr. et al. | |
| 5,301,138 A | 4/1994 | Lindsley | |
| 5,331,582 A | 7/1994 | Sudo et al. | |
| 5,343,254 A | 8/1994 | Wada et al. | |
| 5,408,267 A | 4/1995 | Main | |
| 5,526,058 A * | 6/1996 | Sano et al. | 348/675 |
| 5,589,889 A | 12/1996 | Kawaoka | |
| 5,675,822 A | 10/1997 | Kelley | |
| 5,677,741 A | 10/1997 | Yui | |
| 5,889,565 A * | 3/1999 | Brennesholtz | 348/675 |
| 5,941,939 A | 8/1999 | Pan et al. | |
| 5,987,167 A | 11/1999 | Inoue | |
| 6,020,921 A | 2/2000 | Aleksic et al. | |

(Continued)

FOREIGN PATENT DOCUMENTS

EP 0651577 A2 5/1995

(Continued)

OTHER PUBLICATIONS

Kaufman, H.J. et al.; Real-time 2-D homomorphic filter for broadcast TV signals; Consumer Electronics, IEEE Transactions on; May 1992 vol.: 38 , Issue: 2; pp. 48-56.*

*Primary Examiner*—R. Stephen Dildine
(74) *Attorney, Agent, or Firm*—W. Daniel Swayze, Jr.; W. James Brady; Frederick J. Telecky, Jr.

(57) ABSTRACT

A video correction system and method are disclosed that provide video correction for an input signal. The system includes a logarithmic converter that creates a logarithmic representation of the input signal. A configurable corrector/converter comprises a plurality of associated components operative to process the logarithmic representation of the input signal. The configurable corrector/converter produces an output signal having at least one desirable signal characteristic. A switch control selects a configuration for the corrector/converter. The configuration indicates at least one of the plurality of associated components that will process the logarithmic representation.

21 Claims, 9 Drawing Sheets

| U.S. PATENT DOCUMENTS | | | | FOREIGN PATENT DOCUMENTS | | |
|---|---|---|---|---|---|---|
| 6,289,367 B1 | 9/2001 | Allred | | EP | 1111904 A2 | 6/2001 |
| 6,292,165 B1 | 9/2001 | Lin et al. | | EP | 1349389 A2 * | 10/2003 |
| 6,340,996 B1 | 1/2002 | Nakamura | | | | |
| 6,441,870 B1 | 8/2002 | Rapaich | | | | |
| 2004/0267854 A1* | 12/2004 | Haider et al. ............... 708/512 | | * cited by examiner | | |

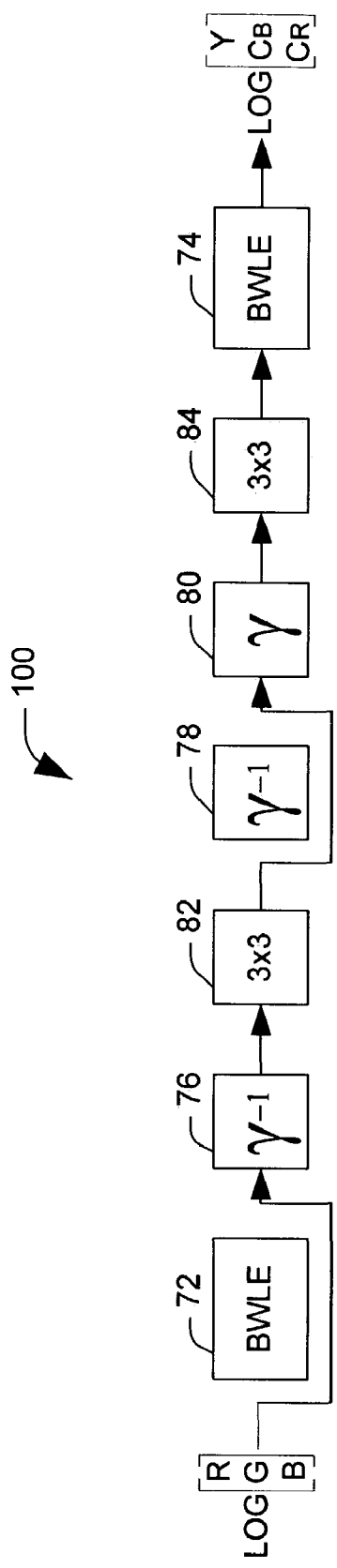
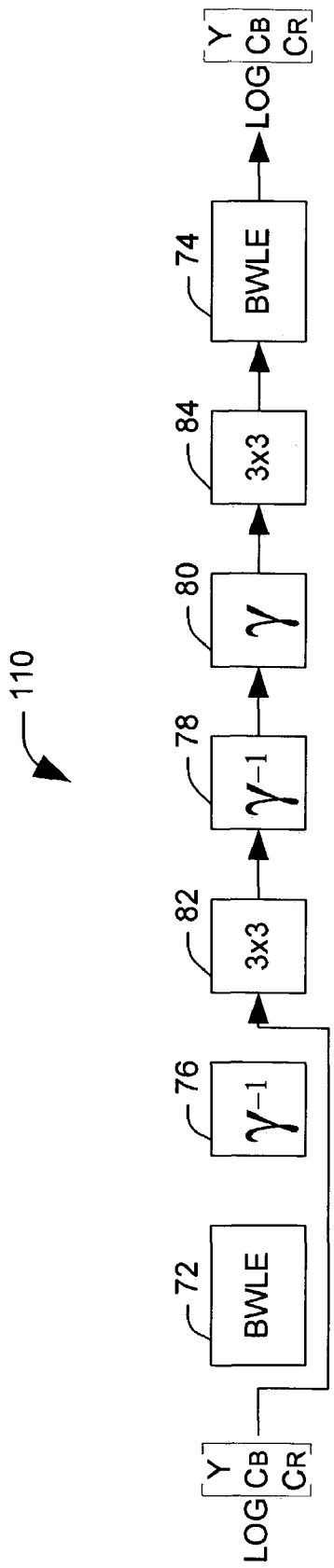
FIG. 5
FIG. 6

VIDEO CORRECTION SYSTEM AND METHOD USING LOGARITHMIC CONVERSION

TECHNICAL FIELD

The present invention relates generally to electronic devices, and more particularly to video correction systems.

BACKGROUND OF THE INVENTION

It has long been known that cathode ray tubes do not provide a light intensity that is linearly proportionate to a voltage applied to the tube. Instead, the intensity is proportional to the value of the applied voltage raised to an exponential factor gamma. Most cameras and other sensors record an image linearly. To prevent the non-linear behavior of the cathode ray tube from distorting a recorded image, it is necessary to apply a gamma value as an exponential correction factor before displaying the image.

Defined television standards require consumer television consoles to operate at a standardized gamma value. This allows commercial television stations to apply the gamma correction before a video signal is broadcast to eliminate the need for gamma correction in each individual console. Not all display systems, however, are subject to these standards. Computer monitors, for example, are not standardized to this broadcast gamma value, which can result in color distortion when displaying material from broadcast sources. In fact, most computer monitors completely ignore the effects of gamma distortion, leading to discrepancies in color between material on different displays.

The correction of the gamma value is further complicated by the translation of a signal between color domains. Television signals are typically transmitted using the YCbCr model, which represents a pixel according to its intensity Y, and two color difference values, Cb and Cr. Computation of a gamma corrected signal becomes prohibitively complex when the signal is represented in the domain defined by the Y, Cb, and Cr values. Thus, prior to gamma correction, it is necessary to transform the signal into an RGB color space domain, in which a pixel is represented by values indicating its content of red, green, and blue.

Further, even where an input signal is already in the RGB color space domain, it may be necessary to correct it for chromatic aberrations caused by differing RGB systems associated with the acquiring device (e.g., a camera or scanner) and the display. There are a number of different standards for the RGB color space domain, such as the National Television System Committee (NTSC) standard used by the United States, Japan, and a number of other nations, and the European Broadcasting Union (EBU) standard, used mainly by nations of Europe. Each standard defines the primary colors (i.e., red, green, and blue), differently, such that a display designed to receive signals broadcast according to the NTSC standard will show significant chromatic aberrations when receiving signals in the EBU standard.

Past solutions have included the use of look-up tables for correcting for differences in the gamma values and chromaticity values of displays. While this is effective for applications with a fixed input gamma value and a fixed output gamma value, it does not allow the user to change the gamma adjustment to suit personal preference or to adjust for inputs with varying associated gamma values. It would be inefficient to include a range of look-up table values for every possible degree of gamma correction that might be desired by a user. Thus, an efficient and cost-effective video correction system capable of adjusting to a wide range of input gamma values would be desirable.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to video correction systems and method. A system is configurable to adapt to differing input and output formats as well as differing video correction functions. These video correction functions can include altering an associated gamma value of the input signal, transforming the signal to an alternative color space domain, and/or correcting for inconsistencies between devices utilizing a common color space domain.

In accordance with one aspect of the present invention, a system provides video correction for an input signal. A logarithmic converter creates a logarithmic representation of the input signal. A configurable corrector/converter comprises a plurality of associated components operative to process the logarithmic representation of the input signal. The configurable corrector/converter produces an output signal having at least one desirable signal characteristic: A switch control selects a configuration for the corrector/converter. The configuration indicates at least one of the plurality of associated components that will process the logarithmic representation.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 5 illustrates a block diagram of a first configuration of the exemplary configurable converter/corrector of FIG. 4.

FIG. 6 illustrates a block diagram of a second configuration of an exemplary configurable converter/corrector of FIG. 4.

DETAILED DESCRIPTION OF INVENTION

The present invention relates to video correction systems and methods for correcting chromatic aberrations and deviations within an input signal. These deviations can be the result of differences between an acquiring source and the display associated with the system, including differences in the color space domains, the associated gamma factors, and the gain and pedestal values of the source and display. One or more corrective processes can be applied to the input signal, depending upon its expected characteristics and the characteristics of a desired output signal. The processes applied to the input signal, and the order in which they are applied, will be controlled by a system configuration. This system configuration can employ switches to direct the signal to various system components while bypassing others.

Figure 1:
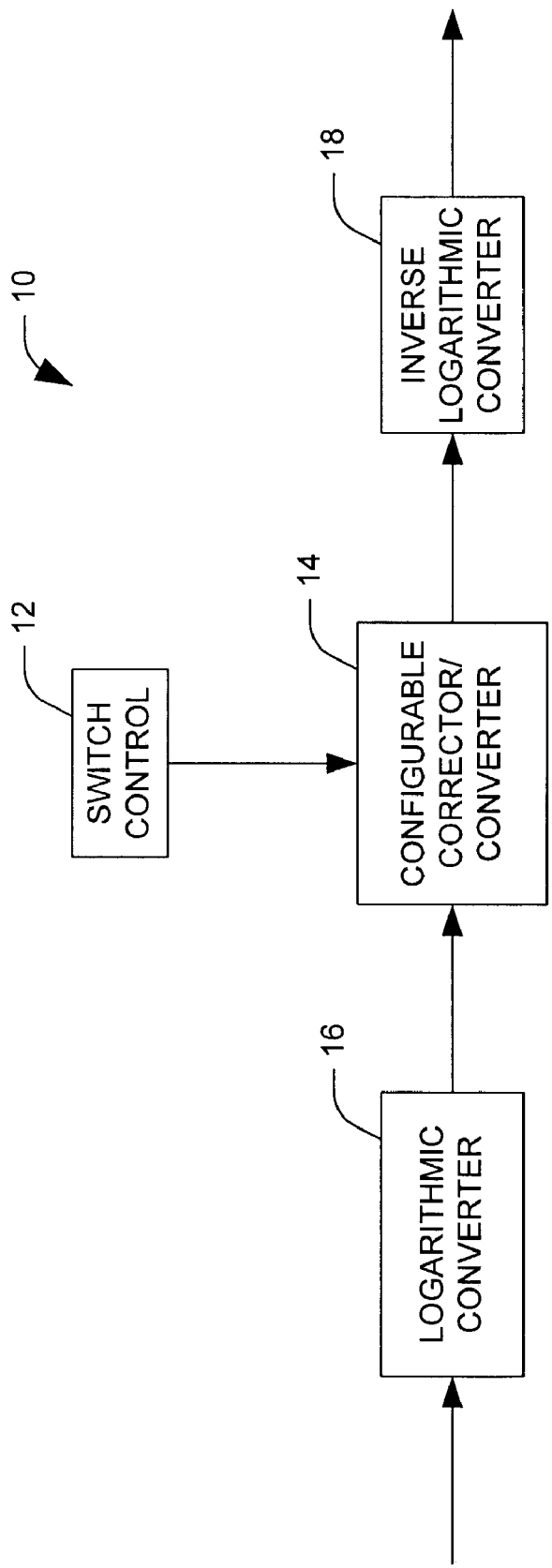
FIG. 1 illustrates a block diagram of a video correction system in accordance with an aspect of the present invention.

FIG. 1 illustrates a block diagram of a video correction system 10 in accordance with an aspect of the present invention. The illustrated system 10 can be implemented as hardware components on one or more integrated circuits. Alternatively, one or more of the illustrated functions may be implemented as software on a general purpose processor or controller. In the illustrated example, the video correction system 10 is implemented in a single application specific integrated circuit (ASIC).

The system 10 includes a switch control 12. Prior to processing of the input signal, the switch control 12 sets the system configuration. The switch control 12 changes the configuration of a configurable corrector/converter 14 in response to one or more characteristics of the input signal and a desired output signal. In an exemplary implementation, the controlling characteristics include associated color space domains of the input signal and the desired output signal. In changing the configuration of the corrector/converter 14, the switch control 12 determines which of a plurality of components associated with the corrector/converter 14 that will process the input signal. The corrector/converter 14 can include a variety of components, including components for providing gamma correction to a signal, removing gamma correction from a signal, converting a signal between color space domains, and correcting a signal within a color space domain. It will be appreciated that the above list is non-exhaustive, and that the specific components within the corrector/converter 14 can vary with the application.

In the illustrated example, the switch control 12 is configurable by an operator to respond to known characteristics of input signals, for example, by programming logic associated with the switch control 12. For example, the associated color space and gamma of the input signal will generally be known prior to operation of the video correction system 10. Similarly, the switch control can be configured to correspond to desired characteristics of an output signal. Alternatively, the switch control 12 can evaluate the input signal to determine characteristics of the input signal and configure the switches accordingly. In such a case, the switch control 12 can also provide configuration data to other components within the system.

In the illustrated example, the system 10 is configured such that each active component will receive data that is represented in an appropriate color space domain. For example, it is desirable to perform gamma correction on a signal within an RGB domain. Thus, if the input signal is provided in a YCbCr domain, the switch control 12 will operate to delay gamma correction of the signal until after the signal has been converted to the RGB domain. In an exemplary embodiment, this delay is accomplished by bypassing a first gamma correction component in favor of a second correction component later in the sequence. Similarly, black and white level correction of a signal is readily performed in the YCbCr domain. Thus, where the input signal is in the YCbCr domain, the switch control 12 can select a component to provide black white level correction at an early stage in the processing.

The system 10 receives an input signal at a logarithmic converter 16. The logarithmic converter 16 generates a representation of the input signal in the logarithmic domain. In the illustrated example, the input signal is a digital signal consisting of three chromatic components (e.g., R, G, and B, or Y, Cb, and Cr), each representing a different chromaticity value. The logarithmic converter 16 produces a logarithmic representation for each of these component signals. In the illustrated example, the logarithmic representation is equal to the base two logarithm of the component signal values. The logarithmic converter 16 comprises an interpolation stage and a correction stage. In the interpolation stage, an integer value for the logarithm is determined as the most significant bit of the signal value, and a mantissa value is estimated as the ratio of the remainder to the value of the most significant bit. One or more correction stages refine the approximation by adding correction values derived as functions of the mantissa value. The logarithmic converter 16 can be implemented as software on a general purpose processor, or as a series of hardware components.

The signal is passed from the logarithmic converter to the configurable corrector/converter 14. At the corrector/converter 14, the signal is processed to produce a signal in a desired output state. For example, the gain and pedestal of the signal can be adjusted, the color space domain of the signal can be changed, and a gamma value associated with the signal can be adjusted or removed entirely. The corrector/converter 14 includes a plurality of components, which can be operative to perform these functions as well as other video correction functions. One or more of the plurality of components are selected by the switch control 12 to process the signal. The processed signal is provided to an inverse logarithmic converter 18.

At the inverse logarithmic converter 18, the signal is converted from the logarithmic domain to a standard domain. The inverse logarithmic converter 18 corresponds to the logarithmic converter 14, essentially reversing the original logarithmic transformation of the signal components. The inverse logarithmic converter 18 receives a signal value for each of the three signal components, each signal value comprising an integer portion and a mantissa.

The inverse logarithmic converter 18 includes at least one precorrection stage that subtracts a function of the mantissa from the received mantissa. The corrected mantissa and integer value are then provided to a restoration stage that produces a standard domain value from the integer portion and the precorrected mantissa. The restoration stage operates to reverse of the linear interpolation process of the logarithmic converter 16. The inverse logarithmic converter 18 can be implemented as computer software program installed on a general purpose processor or as an arrangement of signal processing hardware. The output of the logarithmic converter 18 is a corrected signal having one or more desired signal characteristics.

Figure 2:
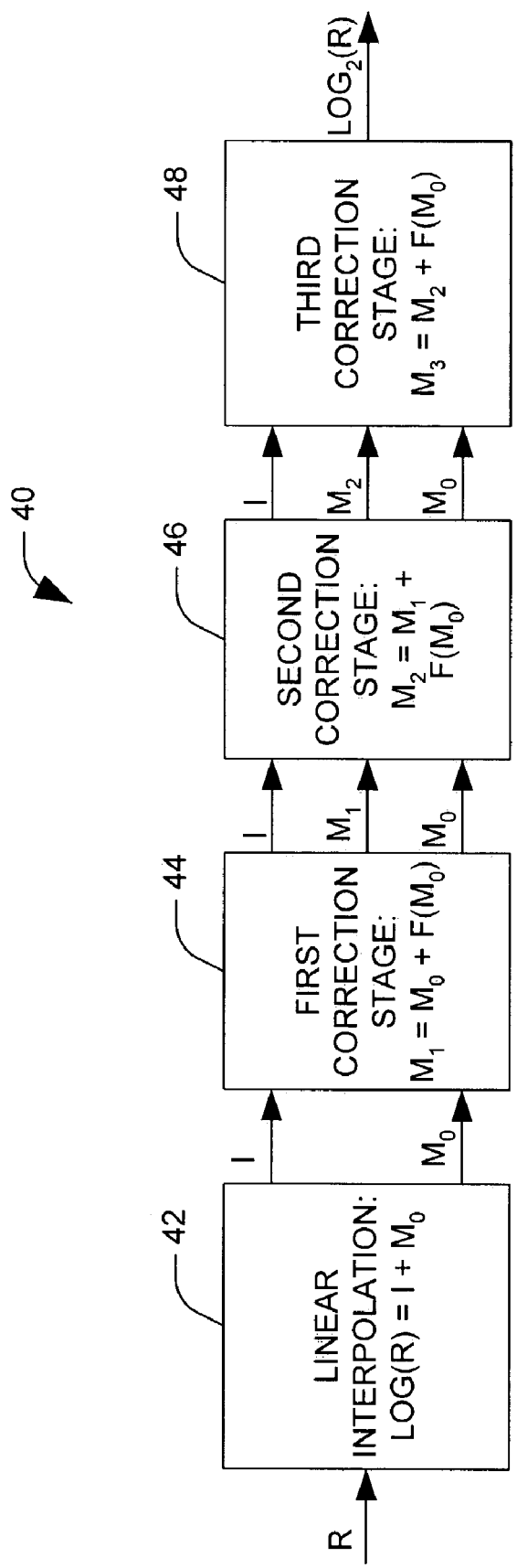
FIG. 2 illustrates a block diagram of a logarithmic converter in accordance with an aspect of the present invention.

FIG. 2 illustrates a block diagram of an exemplary base-two logarithmic converter 40 in accordance with an aspect of the present invention. The logarithmic converter 40 can be implemented as software on a general purpose processor. Alternatively, the logarithmic converter can be implemented as specialized hardware components. FIG. 2 illustrates a conversion path for one signal component. It will be appreciated that the logarithmic conversion takes place for each component of the input signal, and it is thus necessary to have three separate parallel conversion paths in the logarithmic converter 40, one for each of the signal components. In the illustrated example, the input signal is represented in the RGB color space domain. The described elements of the logarithmic converter 40, however, can be employed for signals outside of the RGB color space domain.

The logarithmic conversion begins at a linear interpolation stage 42. The linear interpolation stage 42 determines an integer value (I) for each of the signal values. Since the example converter uses a logarithmic base of two, the integer value of the logarithm will be equal to the position of the most significant bit (MSB) of the digital signal value. For example, for a signal value of nine (1001), the MSB is in the $2^3$ position. The integer value of the logarithm is thus three. A mantissa value ($M_0$) is then calculated for each component via a linear interpolation between the value of the MSB and the next highest integer power of the logarithmic base. For an example value of nine, the interpolation would take place over the range bounded by $2^3$ and $2^4$. In a base two system, the difference between consecutive integer powers of the base is equal to the value of the lesser of the two integer powers. Thus, mantissa value derived from the interpolation is equal to the ratio of the bits remaining after the MSB is subtracted out and the MSB itself. For a value of nine, the mantissa value would be equal to one (001) divided by eight (1000). Both of these values are provided to a series of correction stages 44, 46, and 48. In the illustrated example, three correction stages are shown. In practice, any number of correction stages can be employed, depending on the desired accuracy and operating time of the application.

At the first correction stage 44, a first correction value is applied to each mantissa ($M_0$) to produce a first corrected mantissa value ($M_1$). In the illustrated example, this correction value is a function of the original mantissa value ($M_0$). Alternatively, the correction function could be a function of the integer value (I) or of both values. The first corrected mantissa value ($M_1$) is provided to a second correction stage 46

At the second correction stage 46, a second correction value is applied to each mantissa ($M_1$) to produce a second corrected mantissa value ($M_2$). In the illustrated example, this correction value is a function of the original mantissa value ($M_0$). Alternatively, the correction function could be a function of the integer value (I), the original mantissa value ($M_0$), or the first corrected mantissa value ($M_1$). The second corrected mantissa value ($M_2$) is provided to a third correction stage 48:

At the third correction stage 48, a third correction value is applied to each mantissa ($M_2$) to produce a third corrected mantissa value ($M_3$). In the illustrated example, this correction value is a function of the original mantissa value ($M_0$). Alternatively, the correction function could be a function of one or more of the integer value (I), the original mantissa value ($M_0$), or the first ($M_1$) or second ($M_2$) corrected mantissa values. The sum of the integer value and the third corrected mantissa value provide an accurate approximation of the logarithm of the signal component.

Figure 3:
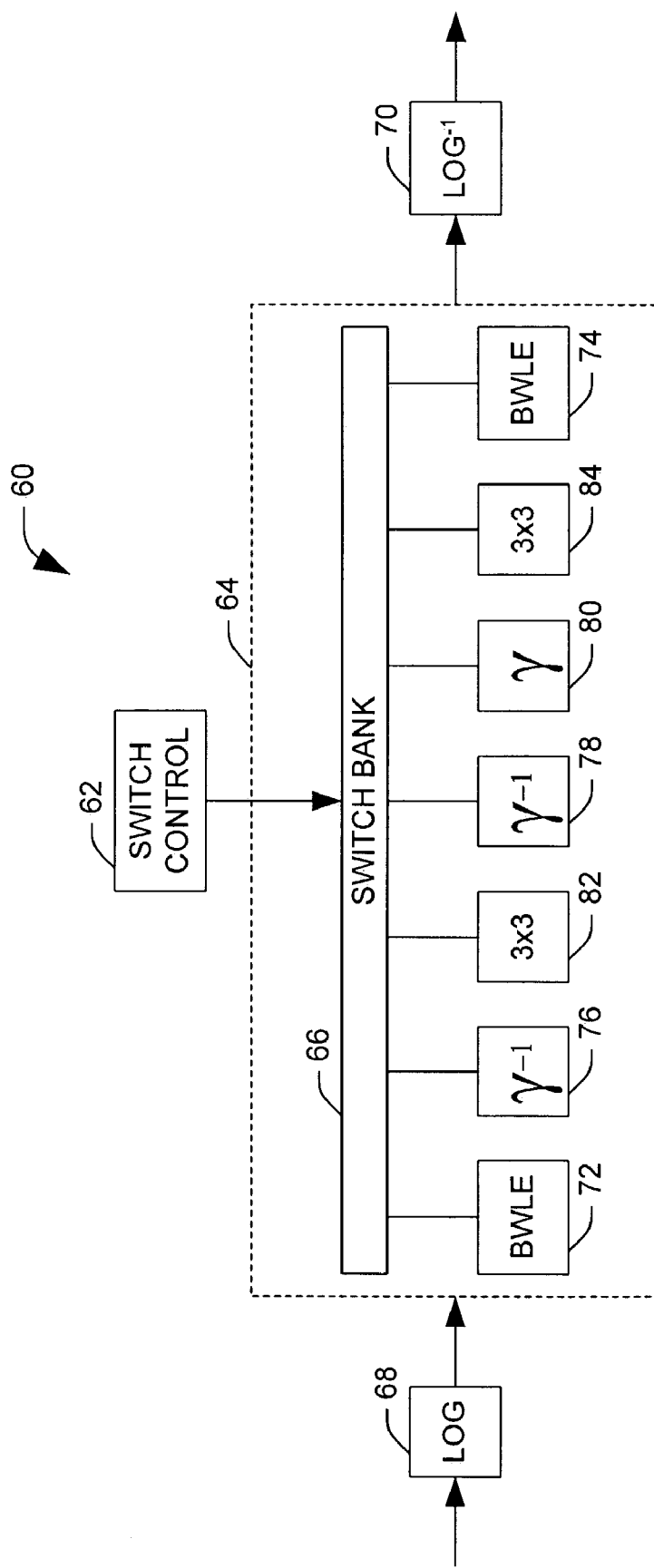
FIG. 3 illustrates a block diagram of an exemplary video correction system in accordance with an aspect of the present invention.

The video correction system of the present invention can be implemented to provide video correction for a variety of input and output configurations. FIG. 3 illustrates an exemplary implementation of a video correction system 60, in accordance with one aspect of the invention, that is operative to correct video signals in two common color space domains, the RGB (red, green, and blue) color space domain and the YCbCr (luminescence, blue chromaticity, and red chromaticity) color space domain. It will be appreciated, however, that the present invention can be adapted to process inputs from other color space domains, such as the CMY (cyan, magenta, and yellow) domain. In the illustrated implementation, the system 60 can be configured to accept four different combinations of input and output color space domains. For each combination, a switch control 62 configures a corrector/converter 64 to process the input at one or more associated components.

Prior to the operation of the system 60, the switch control 62 configures one or more switching mechanisms in a switch bank 66 to provide an appropriate system configuration. The switch control 62 selects one or more components in the corrector/converter 64 according to known characteristics of the input signal and the desired output signal. The switch bank 66 alters its switching arrangement to provide the input signal to the selected components. During operation, an input signal is received at a logarithmic converter 68. The logarithmic converter 68 transforms the input signal into a logarithmic domain and provides it to the corrector/converter 64.

The corrector/converter 64 comprises a number of components. In the illustrated example, the corrector/converter includes a first and second black and white level expander 72 and 74, a first, second and third gamma corrector 76, 78, and 80, and a first and second chromaticity correctors 82 and 84. In the illustrated example, several of the components are functionally redundant, but included to simplify the switching arrangement. For example, in the illustrated implementation, only one of the first and second black and white level expanders 72 and 74 will be used to process a particular signal. By placing a black and white level expander at locations near the input and the output of the converter/corrector, it is possible to process the signal at the more appropriate point in the processing by bypassing one expander and selecting the other.

The first and second black and white level expanders 72 and 74 act to increase the contrast between the pedestal (black) and gain (white) of the signal. Black and white level expansion is readily performed in a YCbCr color space domain. Therefore, in the illustrated example, the corrector/converter 64 will only be configured to select the input first black and white level expander 72 when the input signal is represented within the YCbCr domain. Similarly, the corrector/converter 64 will only be configured to select the input signal at the second black and white level expander 74 when the desired output signal is represented within the YCbCr domain. To avoid redundant processing with the second black white level expander 74, the first black and white level expander 72 will be bypassed when the desired output is in the YCbCr domain, even where the input signal is also in the YCbCr domain.

Within the black and white level expanders 72 and 74 of the exemplary implementation, the value of the Y component is altered according to a specified gain factor. Since Y is expressed in the logarithmic domain when it reaches the black and white level expander 72 and 74, the gain can be applied by simply adding a corresponding value to the logarithmic representation of the Y component of the signal. It will be appreciated, however, that the black and white level expanders 72 and 74 can be designed to alter the gain and pedestal of signals for signals outside the YCbCr domain where the application so requires.

The first and second gamma correctors 76 and 78 are operative to remove an associated exponential gamma value of the input signal. In the illustrated example, the corrector/converter 64 is configured to provide the input signal to first gamma corrector 76 where the input signal is already represented in the RGB color space domain, and to the second gamma corrector 78 where the input signal is represented in the YCbCr domain. In a manner similar to that of the black and white level expanders 72 and 74, the redundant function of these components is provided to simplify the switching process.

The input signal is provided to the first gamma corrector 76 as a logarithmic representation of the signal biased by an exponential gamma coefficient associated with the device producing the signal. For example, the gamma value can be associated with a video camera or other sensor. Gamma correction can be provided to the signal as a multiplicative correction factor applied to each chromatic component of the signal. The correction factor will be equal to the multiplicative inverse of the gamma associated with the input signal and will generally have a value greater than one. The first and second gamma correctors 76 and 78 will correct for an associated gamma of an input signal to produce an unbiased RGB signal. By unbiased, it is meant that the RGB data does not contain any gamma correction; the associated gamma factor of an unbiased signal is equal to one. The associated gamma value for the input signal is provided to the first and second gamma corrector 76 and 78 as a configuration parameter. In the illustrated example, the characteristic gamma is provided by an operator and may be adjusted during operation.

The third gamma corrector 80 applies a gamma value associated with the system display to the input signal. Unlike the first and second gamma correctors 76 and 78, which remove a prior gamma correction from the signal, the third gamma corrector 80 corrects an unbiased signal with a gamma correction value specific to the system display. This value depends on the properties of the display, and is provided by an operator as a configuration parameter. Depending on the application, this gamma value can be made adjustable by an end-user. This gamma value can be applied as a multiplicative factor to the logarithmic representation of the three signal components, (e.g., R, G, and B). Thus, the third gamma corrector 80 can be structurally identical to the first and second gamma correctors 76 and 78, with a different associated gamma parameter. Generally speaking, the applied gamma value will be less than one, to account for the non-linear response of the display. The output of the third gamma corrector 80 is a signal in the RGB domain gamma corrected for the display of the present application.

The first and second chromaticity correctors 82 and 84 perform a linear transformation of an input signal to provide an output signal having desired characteristics. As a result of the linear transformation, the output signal will comprise three component signals expressed in the logarithmic domain, each component representing a linear combination of the three components of the original signal. In an exemplary embodiment, this linear transformation takes the form of a three-by-three matrix multiplication. Chromaticity correction can include either a conversion between individual color space domains (e.g., RGB to YCbCr), or a correction within a color space domain to account for differences between an acquiring sensor and the display.

In the illustrated example, the first and second chromaticity correctors 82 and 84 conduct a matrix multiplication of the values of the chromatic components and a series of coefficients in the logarithmic domain. The coefficients are provided as configuration parameters. As will be appreciated, the function of the chromaticity correctors 82 and 84 (e.g., interdomain conversion, intradomain correction of the input signal) is controlled by the coefficients provided to the chromaticity correctors.

In the illustrated example, the first chromaticity corrector 82 will be configured to convert the input signal to the RGB color space domain when a non-RGB input is expected. Inputs that are already in the RGB domain can be corrected for any deviation from a standard RGB domain associated with the system 60. For example, gain or offset values can be applied to the signal to adjust the RGB domain from that utilized by the acquiring camera to that desired by the display. In the illustrated example, the output of the first chromaticity corrector 82 will be represented in the RGB domain to facilitate gamma correction of the signal.

At the second chromaticity corrector 84, a gamma corrected RGB signal can be converted into a desired color space domain via a linear transformation. For example, the signal may be changed from the RGB color space domain to the YCbCr color space domain. The second chromaticity corrector 84 can be bypassed where it is desired that the output signal be represented in the RGB domain. The output of the second chromaticity corrector 84 will be a signal having three components, each a linear combination of the three input components.

After the signal is processed at the configurable corrector/converter 64, it is passed to an inverse logarithmic converter. The inverse logarithmic converter 70 converts the logarithmic representation of the signal back to the standard domain. The system output is thus a standard domain signal having one or more desired chromaticity characteristics, such as a desired color space domain, gain and pedestal level, or associated gamma coefficient.

Figure 4:
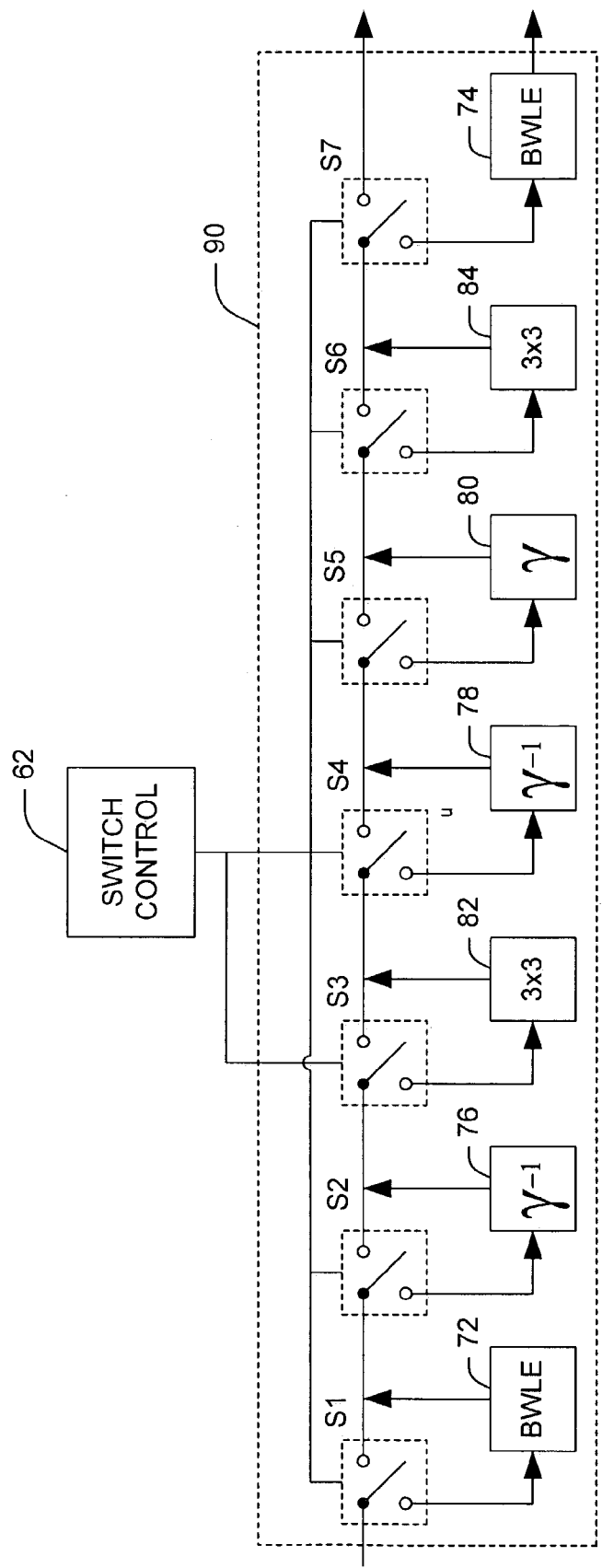
FIG. 4 illustrates a block diagram of an exemplary configurable corrector/converter in accordance with an aspect of the present invention.

FIG. 4 illustrates an exemplary implementation of a configurable corrector/converter 90 for a video correction system in accordance with one aspect of the present invention. The components 72–84 illustrated within the correction system are similar to those described in reference to FIG. 3. It will be appreciated, however, that other video correction components could be substituted within the corrector/converter without departing from the scope of the present invention.

The illustrated corrector/converter 90 comprises a plurality of bypass switches S1–S7 that operate to select or bypass each of the plurality of system components. The switches S1–S7 can be mechanical switches, transistor switches, or any other appropriate switching means. Each component has an associated bypass switch. By toggling each switch between a select state and a bypass state, the switch control 62 can select a plurality of components to receive the input signal.

In the exemplary embodiment, there are four system configurations, based upon the color space domains of the received input signal and the desired output signal. For example, in the first configuration the switch control 62 selects a series of components operative to receive an RGB input signal and output a gamma corrected YCbCr signal. For example, the first black and white level expander 72 will be bypassed, as the input,signal is not in the proper color space domain for adjustment of the gain and pedestal. The first gamma corrector 76, however, can be selected, as the signal is already in RGB form. If the input signal is a YCbCr input signal, another configuration can be selected, where the first gamma corrector 76 is bypassed, but the first black and white level expander 72 is selected. It will be appreciated that other switching arrangements can be used to select components besides the two state switching shown above.

FIGS. 5–8 illustrate sample configurations for the exemplary configurable corrector/converter illustrated in FIG. 4. To facilitate discussion of the exemplary system, the various components within the configurable corrector/converter will retain their numbering from FIG. 4. In the exemplary implementation, the switch configurations are selected in response to color domains associated with the input signal and a desired output signal. The following examples are restricted to the RGB and the YCbCr color space domains, although it will appreciated that the present invention is adaptable to process signals having other associated color space domains.

FIG. 5 illustrates a first configuration 100 of the exemplary corrector/converter illustrated in FIG. 4. The illustrated configuration 100 is appropriate for where the exemplary corrector/converter receives an RGB input signal and the desired output signal is a gamma corrected YCbCr signal. In the illustrated configuration 100, the switch control directs the switch bank to bypass the first black and white level expander 72 and the second gamma corrector 78.

In the illustrated configuration 90, the first black white level expander 72 is bypassed, as the input signal is not in the YCbCr color space domain. Instead, a logarithmic representation of an input signal is directed by the switch bank (not shown) to the first gamma corrector 76, which removes the existing gamma correction from the signal to create an unbiased (e.g., non-gamma corrected) signal. The unbiased signal is then passed to the first chromaticity corrector 82. The first chromaticity corrector 82 operates to convert the signal to a standard RGB for the display. Even a signal that is already represented within the RGB color space domain will retain chromaticity errors from the processing of the signal at the acquiring camera. The linear transform at the first chromaticity corrector 82 translates the input signal from the RGB domain utilized by the acquiring camera to the standard RGB domain utilized by the display associated with the correction system.

The corrected signal is then directed by the switch bank to the third gamma corrector 80. The second gamma corrector is bypassed, as an unbiased signal has already been provided by the first gamma corrector 76. At the third gamma corrector, a gamma value specific to the display associated with the correction system is applied to the signal. The gamma corrected signal is then passed to the second chromaticity corrector 84 for color space conversion, as the desired color space domain for the output is the YCbCr domain.

At the second chromaticity corrector 84, the signal is linearly transformed into the YCbCr color space domain. The YCbCr signal is then sent to the second black and white level expander 74, where the signal is corrected to increase the contrast between the gain and the pedestal of the signal. The output of the corrector/converter in the illustrated configuration 100 is a gamma corrected YCbCr signal represented in the logarithmic domain.

FIG. 6 illustrates a second configuration 110 of the exemplary corrector/converter illustrated in FIG. 4. The illustrated configuration 110 is appropriate for where the exemplary corrector/converter receives a YCbCr input signal and the desired output signal is a gamma corrected YCbCr signal. In the illustrated configuration 110, the switch control directs the switch bank to bypass the first black and white level expander 72 and the first gamma corrector 76. The first black and white level expander 72 is bypassed to avoid redundant processing of the signal, as the second black and white level expander can be selected where a YCbCr output is desired. The first gamma corrector 76 is bypassed because the input signal can not be readily corrected until it has been converted into the RGB domain.

The logarithmic domain signal is instead directed to the first chromaticity corrector 82, where it is linearly transformed into the RGB color space domain. The RGB signal is then provided to the second gamma corrector 78. The second gamma corrector 78 removes the existing gamma correction from the signal to create an unbiased signal. The unbiased signal is then passed to the third gamma corrector 80, where a gamma value specific to the display associated with the correction system is applied to the signal.

The gamma corrected signal is then provided to the second chromaticity corrector 84 for color space conversion, as the desired color space domain for the output is the YCbCr domain. At the second chromaticity corrector 84, the gamma corrected signal is linearly transformed back into the YCbCr color space domain. The YCbCr signal is then sent to the second black and white level expander 74, where the signal is corrected to increase the contrast between the gain and the pedestal of the signal. The output of the corrector/converter in the illustrated configuration 110 is a logarithmic representation of a gamma corrected signal in the YCbCr domain.

Figure 7:
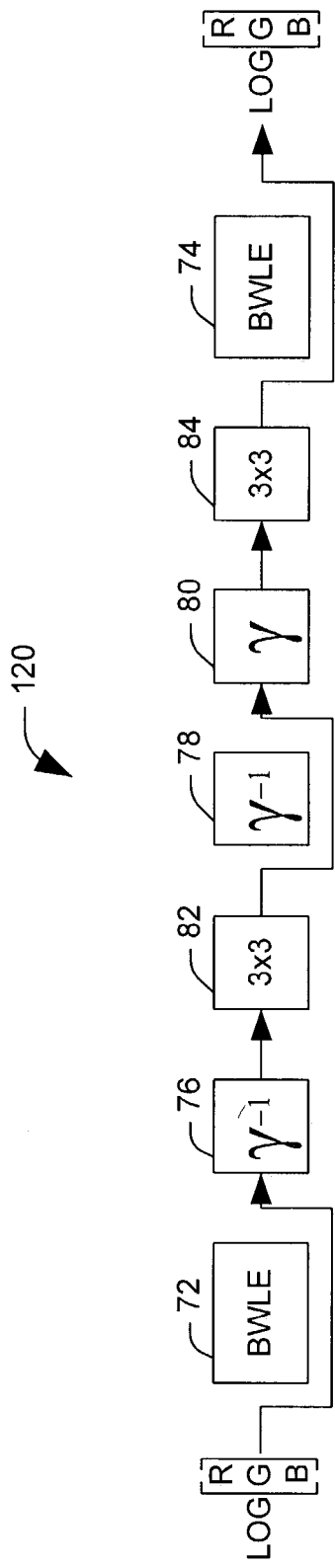
FIG. 7 illustrates a block diagram of a third configuration of an exemplary configurable converter/corrector of FIG. 4.

FIG. 7 illustrates a third configuration 120 of the exemplary corrector/converter from the video correction system illustrated in FIG. 4. The illustrated configuration 120 is appropriate for where the exemplary corrector/converter receives an RGB input signal and the desired output signal is a gamma corrected RGB signal. In the illustrated configuration 120, the switch control directs the switch bank to bypass the first and second black and white level expanders 72 and 74, the second gamma corrector 78, and the second chromaticity corrector 84.

The first black and white level expander 72 is bypassed because the signal is not represented in the YCbCr domain. The RGB input signal is instead provided to the first gamma corrector 76. The first gamma corrector 76 removes the existing gamma correction from the signal to create an unbiased signal. The. unbiased signal is then passed to the first chromaticity corrector 82. The first chromaticity corrector 82 operates to convert the signal to a standard RGB for the display. Even a signal that is already represented within the RGB color space domain will retain chromaticity errors from the processing of the signal at the acquiring camera. The linear transform at the first chromaticity corrector 82 translates the input signal from the RGB utilized by the camera to the standard RGB utilized by the display associated with the correction system.

Since the signal is already unbiased, the corrected signal bypasses the second gamma corrector 78 and proceeds to the third gamma corrector 80. At the third gamma corrector 80, a gamma value specific to the display associated with the correction system is applied to the signal. As the signal is already in the desired color space domain, the second chromaticity corrector 84 is bypassed. The second black and white level expander 74 is also bypassed because the signal is not in the YCbCr domain. Accordingly, the output of the configurable corrector/converter in the illustrated configuration 120 is a gamma and chromaticity corrected RGB output signal represented in the logarithmic domain.

Figure 8:
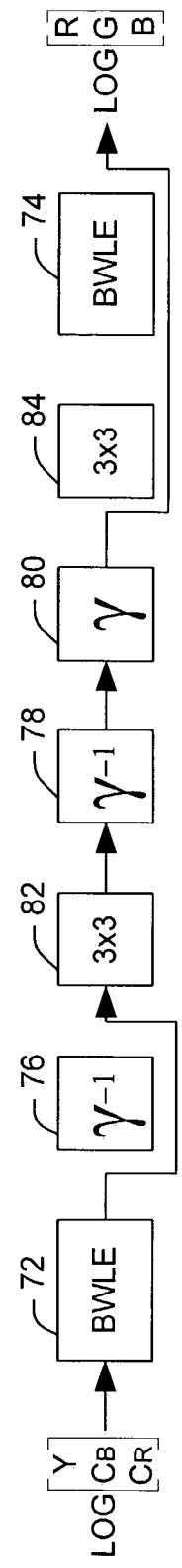
FIG. 8 illustrates a block diagram of a fourth configuration of an exemplary configurable converter/corrector of FIG. 4.

FIG. 8 illustrates a fourth configuration 130 of the exemplary corrector/converter from the video correction system illustrated in FIG. 4. The illustrated configuration 130 is appropriate for where the exemplary corrector/converter receives a YCbCr input signal and the desired output signal is a gamma corrected RGB signal. In the illustrated configuration 130, the switch control directs the switch bank to bypass the first gamma corrector 78, the second chromaticity corrector 84, and the second black and white level expander 74.

An input signal represented in the logarithmic domain is received at the first black and white level expander 76. At the first black and white level expander 76, the signal is corrected to increase the contrast between the gain and the pedestal of the signal. Because the signal is represented in the YCbCr color space domain, the gamma associated with the input signal can not be readily corrected until it has been converted into the RGB domain. The first gamma corrector 76 is thus bypassed, and the signal is provided to the first chromaticity corrector 82, where it is linearly transformed into the RGB color space domain.

The RGB signal is then provided to the second gamma corrector 78. The second gamma corrector 78 removes the existing gamma correction from the signal to create an unbiased signal. The unbiased signal is then passed to a third gamma corrector 80, where a gamma value specific to the display associated with the correction system is applied to the signal. The signal bypasses the second chromaticity corrector 84, as the signal is already represented in the desired color space domain. The second black and white level expander 74 is also bypassed as the signal has already been corrected at the first expander 72. The output of the configurable corrector/converter in the illustrated configuration 130 is a gamma corrected RGB signal in the logarithmic domain.

Figure 9:
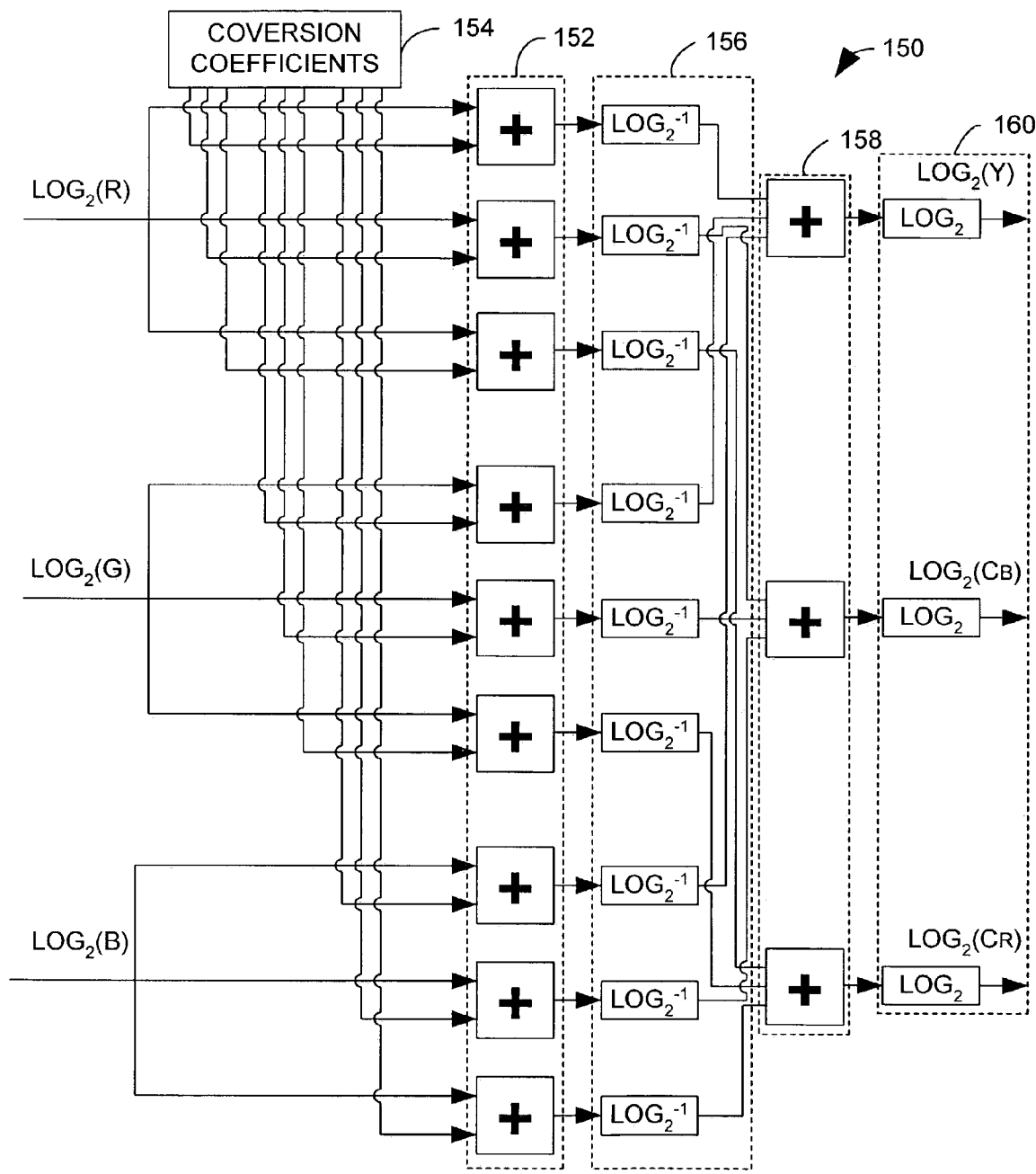
FIG. 9 illustrates a schematic block diagram of a chromaticity corrector in accordance with an aspect of the present invention.

FIG. 9 illustrates a block diagram of an exemplary chromaticity corrector 150 that can be included as one component within a configurable corrector/converter in accordance with an aspect of the present invention. The illustrated chromaticity corrector 150 performs a matrix multiplication to linearly transform an input signal comprising a plurality of chromatic components. This can be accomplished as part of a software program operating on a general purpose processor or by specialized hardware components. In the illustrated example, the chromaticity corrector 150 comprises a series of hardware components that process an input signal in the logarithmic domain In the illustrated example, three chromatic components of an input signal, represented in the logarithmic domain, are received at a first adder array 152. In the illustrated example, the first array comprises nine adders, three for each of the chromatic components. Each adder receives the value of one of the components and a coefficient from a conversion coefficient memory 154. The coefficients can be set by an operator before operation, or they may be provided during operation by the switch control. It will be appreciated that adding the coefficients in the log domain has the effect of multiplying them in the standard domain, producing a set of three products for each of the chromatic components.

To complete the linear transform, it is necessary for these products to be summed. It will be appreciated that standard addition has no equivalent in the log domain. The products are thus converted back to the standard domain by an array of inverse logarithmic converters 156. In the illustrated example, the array comprises nine base-two inverse logarithm converters that produce a standard domain value.

The products, now represented in the standard domain, are provided to a second adder array 158. In the illustrated example, the second adder array 158 comprises three adders, one for each of the chromatic components. Each adder receives three products, each associated with one of the original chromatic components. The array of adders 158 sums the products to produce three new values, each a linear combination of the three original chromatic components. These new values represent the input signal, either within an alternate color space domain, or as a signal within the same color space domain corrected for any deviance in chromaticity between the display associated with the system and the acquiring camera. This deviance can be the result of signal errors created during the RGB splitting within the camera or differences in the specific RGB domains recognized by the display and the camera. In the illustrated example, the chromaticity corrector 150 is transforming the input signal from the RGB color space to the YCbCr color space, so the output of this array would include Y, Cb, and Cr components representing the input signal.

The output of the second adder array 158 is passed to an array of logarithmic converters. The logarithmic converter array 160 converts the standard domain output of the second adder array 158 back into the logarithmic domain. In the illustrated example, the logarithmic converters are base two logarithmic converters that operate similarly to the logarithmic converter described in FIG. 2. The logarithmic converter array 160 outputs a logarithmic representation of the input signal within the desired color space domain.

Figure 10:
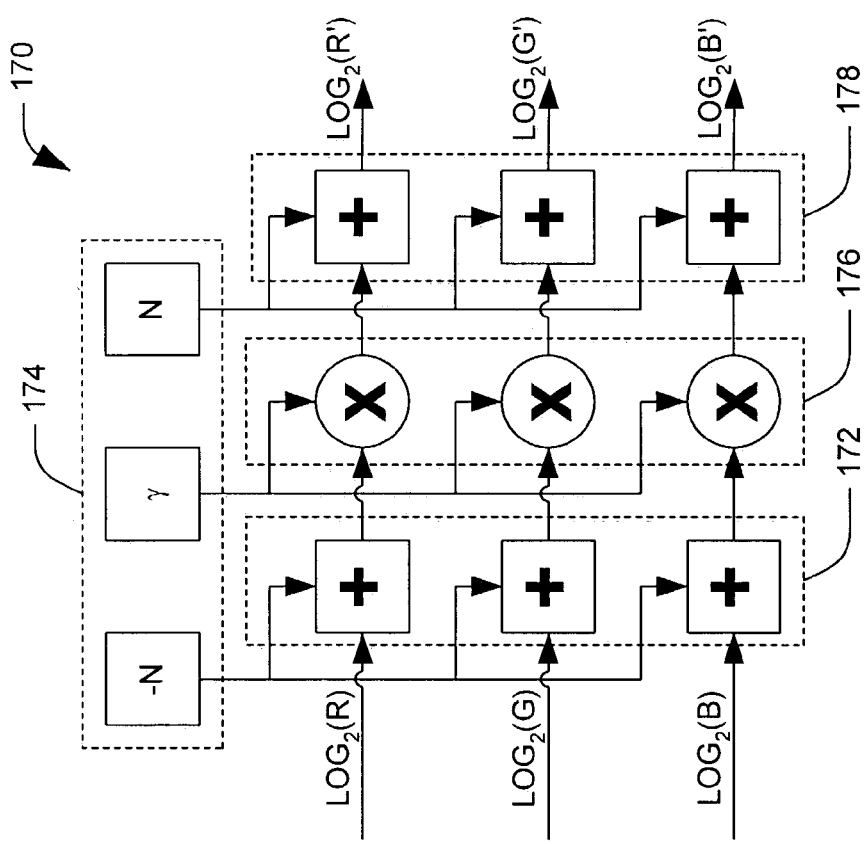
FIG. 10 illustrates a schematic block diagram of a gamma correction component in accordance with an aspect of the present invention.

FIG. 10 illustrates a gamma corrector 170 that can be included within a configurable corrector/converter in accordance with one aspect of the present invention. The gamma correction 170 operates on an input signal having R, G, and B chromatic components represented within the logarithmic domain. While it is possible to perform gamma correction over other color space domains, such correction can require extensive computation or a large look-up table. Thus, in the illustrated example, gamma correction is performed on a signal represented within the RGB color space domain.

The signal is first received at an array of normalization adders 172. Since the RGB signal contains three components, the normalization array 172 comprises three adders, each receiving a normalization factor from a parameter memory 174. The addition of the normalization factor brings the received signal into an appropriate range for further operation. In the illustrated example, the normalization constant is equal to negative ten. This corresponds to a division by 1028 in the standard domain, which is sufficient to reduce the signal to a value between zero and one. The choice of a normalization factor will depend on the application. Where a normalization factor is unnecessary, the normalization constant may be set to zero, corresponding to a multiplication by one.

The normalized signals are sent to an array of multipliers 176 that multiply the signal by a gamma correction factor retrieved from the parameter memory 174. The value of the gamma factor may be predetermined by a human operator or provided through the switch control. Multiplication of the signal by the gamma correction factor within the logarithmic domain is equivalent to taking the signal to the power of the gamma correction factor within the standard domain. Accordingly, a computationally intensive computation is simplified by representing the input signal within the logarithmic domain.

The value of the gamma factor will depend on the application and the intended purpose of the gamma corrector 170. Where the gamma corrector is intended to remove an existing gamma correction from an input signal, the gamma factor will be equal to the inverse of the known or detected gamma factor associated with the signal. In the illustrated example, this inverse gamma factor will be a value greater than one. Where a gamma corrector is providing gamma correction specific to a display associated with the system, the gamma factor is known from the characteristics of the display, and will generally be a value less than one. This display gamma factor can be made configurable by an end-user of the display.

The output of the multiplier array 176 is provided to an array of restoration adders 178. The restoration adders add a restoration factor equal to the additive inverse of the normalization factor to the signal to restore the signal to its original range. In the illustrated example, the restoration factor has a value of 10, making the restoration process equivalent to multiplying the signal by a factor of 1028. The multiplier array 76 outputs a gamma corrected equivalent of the original input signal.

Figure 11:
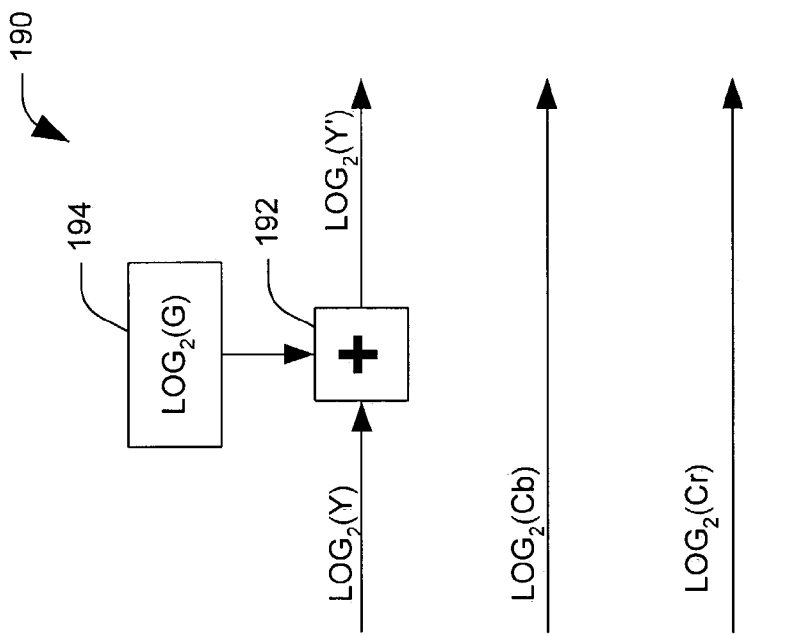
FIG. 11 illustrates a black and white level expander that can be included within a configurable corrector/converter in accordance with one aspect of the present invention.

FIG. 11 illustrates a black and white level expander 190 that can be included within a configurable corrector/converter in accordance with one aspect of the present invention. The black and white level expander 190 operates on a luminance (Y) component of an input signal having Y, Cb, and Cr chromatic components represented within the logarithmic domain. While it is possible to perform black and white level expansion over other color space domains, such correction can require extensive computation or a large look-up table.

The luminance component of the input signal, represented in the logarithmic domain, is passed to an adder 192. As a second input, the adder 192, is provided with a parameter from a parameter memory 194 reflecting the logarithmic value of a desired gain factor. This parameter will be determined as a configuration parameter prior to system operation. In an exemplary embodiment, the coefficient will be adjustable by an operator to allow for changes in the gain and pedestal values of the display. It will be appreciated that the addition of the gain factor and the luminance component in the logarithmic domain is equivalent to multiplying the two values in the standard domain. The system output is therefore a logarithmic representation of the input signal having desired gain and pedestal values.

Figure 12:
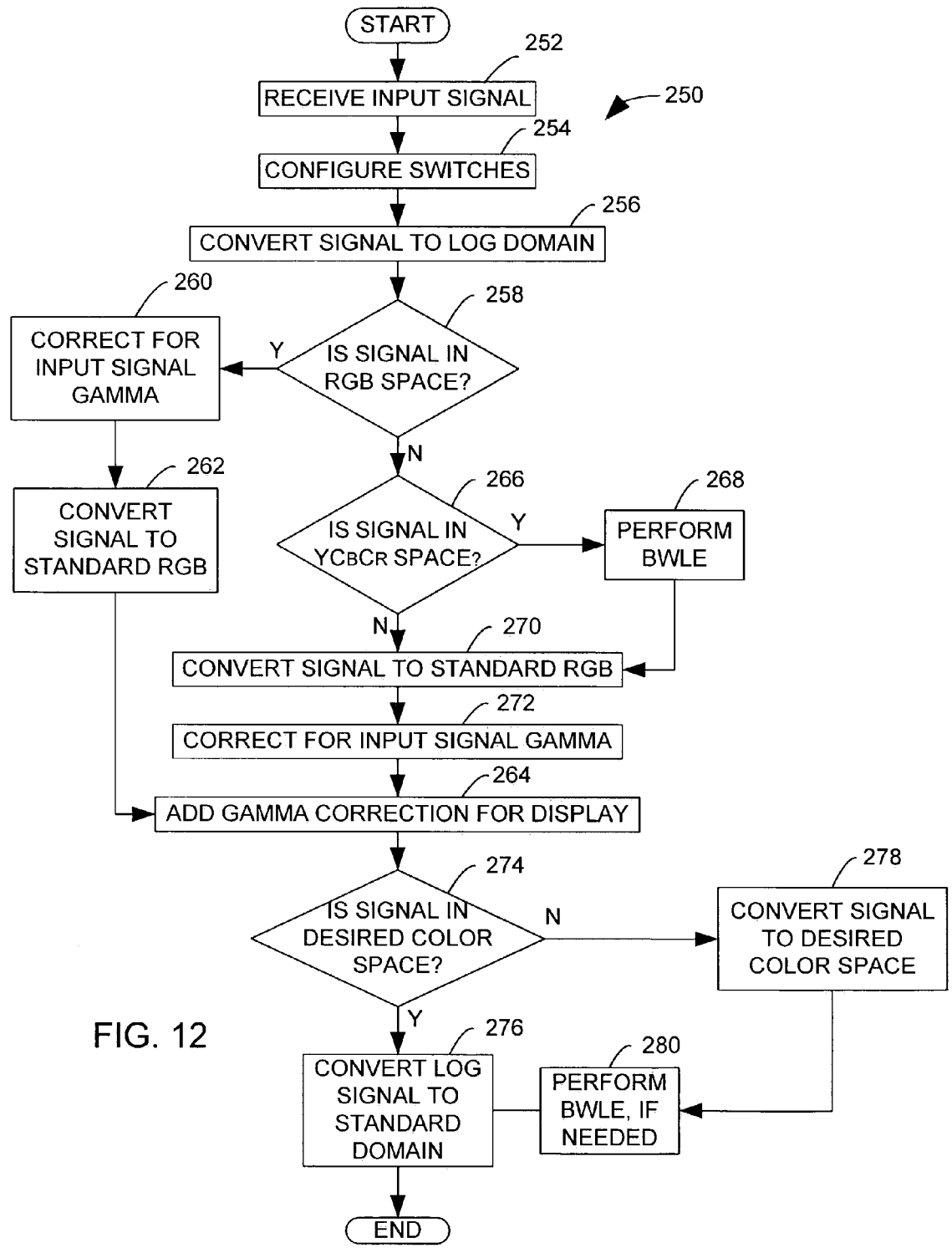
FIG. 12 illustrates a methodology for performing video correction of an input signal in accordance with an aspect of the present invention.

FIG. 12 illustrates a methodology for performing gamma correction and color space conversion of an input signal in accordance with an aspect of the present invention. The process begins with the reception of an input signal at 252. After the input signal is received, a series of switches within the system are configured to select a plurality of correction components according to a characteristic of the input signal and a desired output signal at 254. The characteristic of the input signal may be determined upon reception, or the configuration of the switches may be based upon an expected characteristic provided by an operator as a configuration parameter.

At 256, the input signal is converted to the logarithmic domain. Generally, in digital processing, the base two logarithmic domain is most useful, but any logarithmic base may be used without departing from the scope of the claimed invention. At 258, it is determined if the input signal is represented in the RGB color space domain. If so, one of the switches will pass the signal to a gamma corrector. The signal is then processed at 260 to remove its associated gamma correction and produce an unbiased signal. At 262, the signal is converted to a standardized RGB domain specific to a display associated with the system. The process then proceeds to a display specific gamma correction at 264.

Returning to 258, if the signal is not represented in the RGB color space domain, it is determined if the signal is represented in the YCbCr color space domain at 266. If so, a black and white level conversion is conducted on the signal at 268 before the process continues to 270. If not, the process proceeds directly to 270, where the signal is converted to a standard RGB domain specific to the display. This RGB signal is then corrected at 272 to remove a gamma value associated with the input signal and produce an unbiased signal.

At 264, an unbiased signal is gamma corrected using a gamma factor specific to the display. At 274, it is determined if the input signal is in a desired color space domain for the output. If the signal is represented in the desired output color space domain, the signal is converted from the logarithmic domain to the standard domain at 276. The process then terminates.

If the signal is not represented in the color space of the desired output signal, the signal is converted to the desired color space at 278. The gain and pedestal values of the signal are then corrected at 280 if necessary. This is only necessary if the signal has not been previously corrected at step 268. The signal is then converted from its logarithmic representation into the standard domain at 276, and the process terminates.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A video correction system, comprising: a logarithmic converter that creates a logarithmic representation of an input signal; a configurable corrector/converter having a plurality of associated components operative to process the logarithmic representation to produce an output signal having at least one desirable signal characteristic; and a switch control that selects a configuration for the corrector/converter, the configuration indicating at least one of the plurality of associated components to process the logarithmic representation.

2. The system of claim 1, the switch control selecting a configuration according to a characteristic of the input signal.

3. The system of claim 2, the switch control selecting a configuration based on an expected color space domain of the input signal and a desired color space domain of the output signal.

4. The system of claim 1, the configurable corrector/converter comprising at least one gamma corrector that alters an exponential gamma coefficient associated with the input signal.

5. The system of claim 4, the at least one gamma corrector comprising at least one configurable gamma corrector, such that the amount of change in the gamma value associated with the input signal may be altered.

6. The system of claim 4, the at least one gamma corrector comprising a plurality of gamma correctors, including a first gamma corrector for removing an exponential gamma factor associated with an input signal and a second gamma corrector for removing an exponential gamma factor associated with an input signal, the selected configuration indicating either the first gamma corrector or the second gamma corrector to process the input signal.

7. The system of claim 6, the plurality of gamma correctors further including a third gamma corrector for providing an exponential gamma factor associated with the system to the input signal.

8. The system of claim 1, the configurable corrector/converter comprising at least one black and white level expander that increases a contrast between a gain associated with the input signal and a pedestal associated with the input signal.

9. The system of claim 1, the configurable corrector/converter including at least one chromaticity corrector that receives a plurality of input components and outputs at least one linear combination of the input components.

10. The system of claim 9, at least one of the chromaticity corrector/converters being configured to convert the input signal from a first color space domain to a second color space domain.

11. The system of claim 9, the at least one chromaticity corrector comprising a logarithmic converter and an inverse logarithmic converter.

12. The system of claim 1, wherein the logarithmic converter, the switch control, and the configurable corrector/converter are implemented as part of an application specific integrated circuit.

13. A video correction system, comprising: means for creating a logarithmic representation of an input signal; means for processing the logarithmic representation to produce an output signal having at least one desirable signal characteristic, the means for processing having a plurality of associated components; and means for selecting at least one of the plurality of associated components to process the logarithmic representation.

14. The system of claim 13, the means for creating a logarithmic representation including means for conducting a linear interpolation between consecutive integer powers of an associated base and means for correcting a mantissa value resulting from the linear interpolation.

15. The system of claim 13, where the system further comprises means for transforming a logarithmic representation of a signal into a standard domain representation.

16. The system of claim 11, the means for transforming a logarithmic representation of a signal into a standard domain representation comprising means for precorrecting a mantissa value associated with the logarithmic representation, and means for producing the standard domain value from an integer value associated with the logarithmic representation and the precorrected mantissa.

17. A method of correcting chromatic deviation within an input signal, comprising: creating a logarithmic representation of an input signal; processing the logarithmic representation to produce an output signal having at least one desirable signal characteristic, the means for processing having a plurality of associated components; and selecting at least one of the plurality of associated components to process the logarithmic representation.

18. The method of claim 17, the associated components being selected according to an expected characteristic of the input signal and a desired characteristic of an output signal.

19. The method of claim 16, the processing of the logarithmic representation including linearly transforming the input signal, the input signal comprising three chromatic components.

20. The method of claim 19, the process of linearly transforming the input signal including adding a plurality of coefficients to logarithmic representations of the three chromatic components to produce three sets of intermediate products.

21. The method of claim 20, the process of linearly transforming the input signal further including transforming the intermediate products from the logarithmic domain to a standard domain, summing the products across sets to form three sums, each sum a linear combination of the three chromatic components.

* * * * *